2,971,094

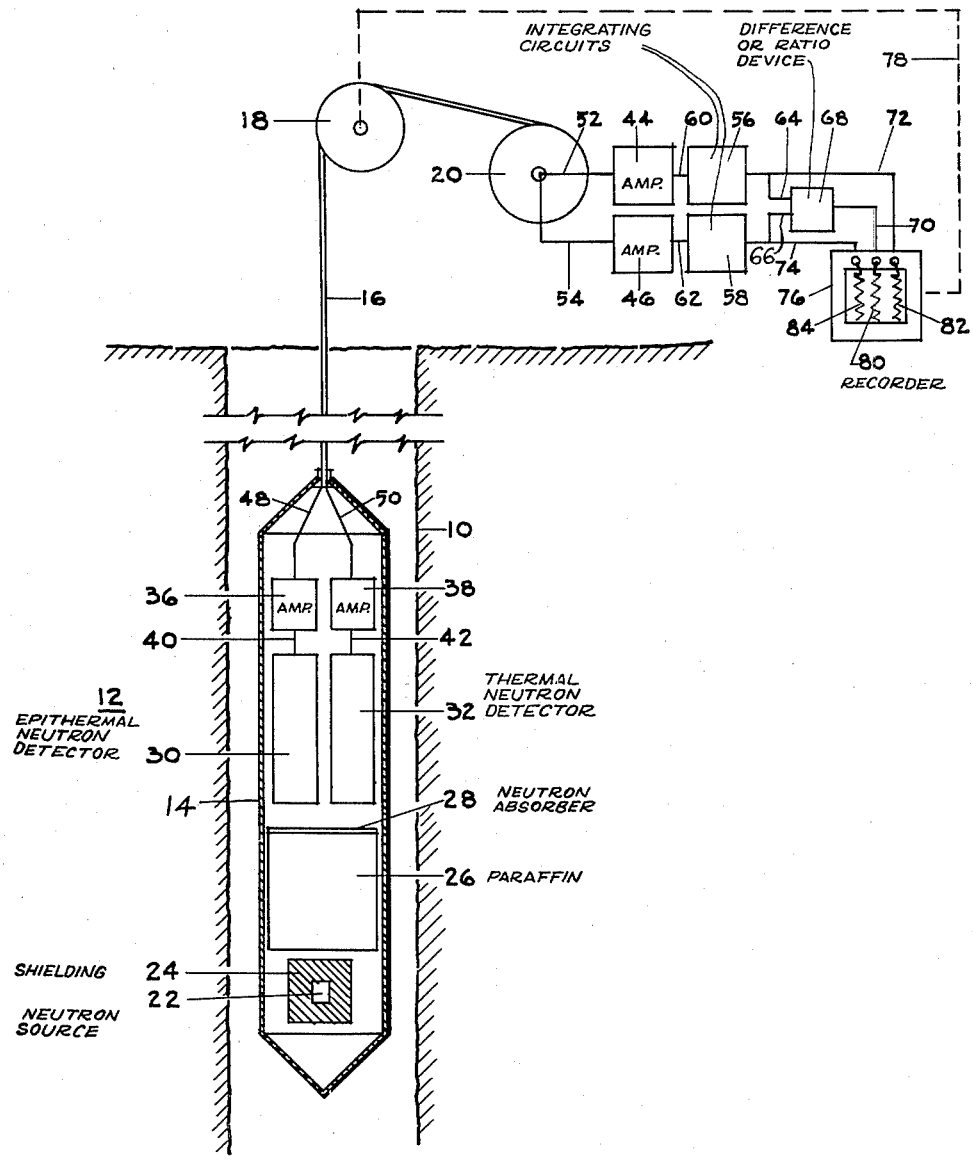

Patented Feb. 7, 1961

2,971,094

WELL LOGGING

Charles W. Tittle, Newton, Mass., assignor to Gulf Research & Development Company, Pittsburgh, Pa., a corporation of Delaware Filed Dec. 27, 1956, Ser. No. 630,942

8 Claims. (Cl. 250—83.3)

This invention pertains to apparatus for and method of logging earth formations traversed by a borehole, and more particularly relates to introducing a thermal-neutron absorber into the earth formations and thereafter bombarding the earth formations with neutrons and logging values that are functions of the rates at which two distinctive classes of penetrating radiation are detected, where one of such rates is relatively more affected by the amount of thermal-neutron absorber introduced into formations than the other.

Broadly, the invention has to do with apparatus for and method of modifying the thermal-neutron absorbing power of an earth formation in a manner characteristic of the porosity and/or mobile fluid content thereof and then logging as a single continuous variable the thermal-neutron absorbing power of the earth formation, where variations of such power are more reliably reflected as a function of the rates at which two distinctive classes of penetrating radiation are detected (one of such rates being relatively more affected by the thermal-neutron absorbing power of the earth formations than the other) rather than either of such rates taken singly.

An important aspect of the invention resides in producing a first electrical signal having a magnitude that is a function of the rate at which the first of two classes of penetrating radiation is detected, producing a second electrical signal having a magnitude that is a function of the rate at which the second class of radiation is detected, and effecting an output electrical signal that is a function of the magnitudes of both the signals. More specific aspects of the invention will appear presently.

As used throughout the specification and the claims, the expression "penetrating radiation" has reference to either gamma rays and/or neutrons. The basis for this classification resides in the fact that gamma rays and neutrons penetrate at least certain types of materials to a far greater extent than most other types of radiation, such as alpha particles, beta rays, other classes of charged particles, etc.

Also, as used throughout the specification and the claims, the expression "distinctive classes of penetrating radiation" has reference to penetrating radiations different in kind, e.g., gamma rays and neutrons; and penetrating radiations of the same kind falling within differing energy ranges.

As previously mentioned, an aspect of the invention involves producing electrical signals having magnitudes that are respectively functions of the rate at which two distinctive classes of penetrating radiation are detected, and effecting an output electrical signal having a magnitude that is a function of the magnitude of the electrical signals. The production of an electrical signal having a magnitude that is a function of the rate at which a class of penetrating radiation is detected includes such forms of mathematical dependence upon the rates of detection as can be in itself of value in interpreting the chemical and/or physical properties of earth formations traversed by a borehole, or which can be correlated with other values to be of interpretive significance. As examples of such dependence, the magnitude of the electrical signal can be linear or directly proportional to the rate of detection. The magnitude of the output electrical signal is a function of the magnitudes of the other electrical signals, and can be, for example, proportional to the magnitude of one of the signals divided by the magnitude of the other signal, or the same can be proportional to the difference between the magnitudes of the signals.

It has been proposed by Russell in his U.S. Patent No. 2,480,674, issued August 30, 1949, that an element be introduced into earth formations where such element differs in its effect on neutron radiation from the material that such element replaces, together with the making of a neutron-neutron log before such insertion, and the making of one or more neutron-neutron logs after such insertion.

It has been proposed by Herzog in his U.S. Patent No. 2,667,583, issued January 26, 1954, that the interface between a brine native to earth formations and liquid hydrocarbons native to such earth formations can be detected by subjecting the earth formations to a fast neutron flux, and producing two electrical signals dependent respectively upon the detection of neutrons having thermal and greater energies, and the detection of neutrons having greater than thermal energies.

The subject invention constitutes an improvement over the aforementioned proposals by Russell and Herzog. Practice of the subject invention involves an improvement over the methods proposed in the patents of Russell and Herzog particularly as to producing an output electrical signal that is substantially solely a function of the concentration of strong thermal-neutron absorbers such as boron or chlorine in adjacent earth formations, especially where concentrations thereof are introduced into the formations that are relatively rich as compared to liquid concentrations of strong neutron absorbers native to the formation.

This and other aspects of the invention will be most readily understood in the light of the following description of a preferred embodiment thereof, taken in conjunction with the accompanying drawing in the nature of a diagrammatic representation of a logging probe and associated electrical measuring and recording apparatus suitable for the practice of the invention.

Referring to the drawing, the numeral 10 designates a borehole that traverses earth formations 12. In general, inasmuch as neutrons and gamma rays are only moderately affected by materials such as steel, the borehole 10 can be either cased or uncased, during logging. A probe housing 14 which can be conveniently fabricated of steel is suspended upon a cable 16 of conventional character that includes insulated electrical conductors therein, not shown. The cable 16 is entrained over a supporting pulley 18 and wound upon a reel 20. The reel 20 is of conventional character and includes means, not shown, for braking and driving the same whereby the probe housing 14 can be lowered and raised within the borehole 10.

A source of fast neutrons disposed within the housing 14 is indicated at 22. The source of fast neutrons 22 can be a radium-beryllium source, or if especially fast neutrons are desired, the same can be a D-T source, as will be understood by those skilled in the art. Where the neutron source 22 is a radium-beryllium source, the same is preferably surrounded by lead or bismuth 24 so as to attenuate gamma rays produced by such a source. In the event a neutron source relatively free of gamma rays is desired, the source 22 can be a polonium-beryllium source.

Disposed above the neutron source 22 is a mass of hydrogenous material, such as paraffin 26, the latter in turn being overlaid by a layer of neutron absorber 28, such as cadmium or boron or compounds thereof. The material 26 and the absorber 28 substantially prohibit the passage of neutrons directly up through the housing 14 from the source 22 to a pair of detectors 30 and 32. Though not shown, it will be understood that gamma-ray shielding can be disposed above the absorber 28, or if desired, gamma-ray shielding can be substituted for the paraffin 26 and the neutron absorber 28.

The detector 30 is sensitive substantially solely to neutrons having epithermal energies; though the same can optionally be a conventionally gamma-ray detector, such as a conventional scintillation crystal and photomultiplier tube combination, where the characteristics of the earth formations are modified by introducing chlorine thereinto for reasons given later. It is generally agreed by those skilled in the art that the expression "epithermal neutrons" includes neutrons having energies ranging from about 0.2 electron volt to several hundred electron volts. It is preferred that the detector 30 be sensitive substantially solely to neutrons having energies ranging from about one to about ten electron volts. In view of this preference, it is preferred that the detector 30 be an epithermal-neutron detector such as that disclosed in my similarly assigned Patent No. 2,769,915 entitled "Epithermal Neutron Detector," issued November 6, 1956, where the detector employs indium as a neutron-reactive substance and is surrounded by lead and cadmium.

The detector 32 is sensitive substantially solely to thermal neutrons, that is, neutrons having an average energy of about 0.03 electron volt. The detector 32 can conveniently comprise a proportional counter filled with boron trifluoride (preferably enriched in $_5B^{10}$).

The outputs of the detectors 30 and 32 are respectively fed to amplifiers 36 and 38 by electrical conduit means 40 and 42, respectively. The outputs of the amplifiers 36 and 38 are fed to amplifiers 44 and 46 disposed above the earth's surface by means including the electrical conduits within the cable 16, not shown, electrical conduit means 48 and 50, and electrical pickup means 52 and 54 operatively connected to the reel 20 in a conventional manner. The outputs of the amplifiers 44 and 46 are respectively fed to counting rate meters or integrating circuits 56 and 58 by means indicated respectively at 60 and 62. The outputs of the integrating circuits 56 and 58 are fed by electrical conduit means 64 and 66, respectively, to an electrical device indicated at 68, the nature of which is described subsequently. The outputs of the device 68 and integrating circuits 56 and 58 are fed by electrical conduit means 70, 72 and 74, respectively, to a conventional recorder 76; such recorder 76 being provided with an operative connection to the pulley 18 indicated schematically by the dashed line 78 so that the outputs of the device 68 and the circuits 56 and 58 are recorded respectively as at 80, 82 and 84 versus the depth of the housing 14 within the borehole 10.

For reasons to be explained in the following description of the practice of the invention, the device 68 can alternatively be a simple subtractive circuit or a ratio responsive circuit, the function of the device 68, depending upon the selected character thereof, being either to produce an output signal having a magnitude dependent upon the difference between the magnitudes of the signals produced by the circuits 56 and 58, or to produce an output signal having a magnitude that is dependent upon the ratio of the magnitudes of the signals produced by the circuits 56 and 58.

In the practice of the invention, a strong thermal-neutron absorber is artificially introduced into the earth formations 12. For example, a strong thermal-neutron absorber, or a composition of matter including a strong thermal-neutron absorber is introduced in the earth formations according to any of the procedures disclosed in the previously mentioned Russell Patent No. 2,480,-674. The preferred method of artificially introducing a strong thermal-neutron absorber into the earth formations 12 involves including in the drilling fluid during the drilling of the borehole 10 a substance having a high thermal-neutron absorbing characteristic, such as compounds of boron or chlorine. Proceeding in such a manner introduces the thermal-neutron absorbing substance into the earth formations 12 during the drilling thereof, with the amount of such substance introduced into particular portions of the earth formations 12 being dependent upon the porosity and/or mobile fluid content thereof, or more specifically in accordance with the extent of drilling fluid invasion of the earth formations.

The substance having a strong thermal-neutron absorbing characteristic is incorporated in the drilling fluid in such a manner as to be included in the filtrate thereof. For instance, where the drilling fluid is water based, that is a straight water-base drilling fluid or an oil-in-water emulsion drilling fluid, the substance is preferably a water-soluble compound of chlorine, such as a water-soluble chloride salt of an alkali metal or an alkaline earth metal (for example, sodium chloride, calcium chloride, etc.), or a water-soluble compound of boron such as borax (sodium tetraborate). Where the drilling fluid is of the type that contains a hydrocarbon oil that is largely represented in the filtrate of the drilling fluid, especially drilling fluids of the type known as oil-based drilling fluids and water-in-oil emulsion drilling fluids, the thermal-neutron absorbing substance can be an oil-soluble compound of chlorine or boron, such as carbon tetrachloride or a stable oil-soluble compound of boron, such as triethylborine, trimethylborine, thiophenylboric acid, or tri-p-anisylborine.

Irrespective of the manner in which the thermal-neuton absorbing substance is introduced into the earth formations, it will be understood that the concentrations thereof introduced in the earth formations must be at least sufficiently great as to produce an overall increase in the thermal-neutron absorbing characteristics of the earth formation upon displacing fluids native to the earth formations. For example, where brine saturated formations are to be logged and the neutron absorbing substance artificially introduced into the earth formations 12 is a compound of chlorine, the chlorine artificially introduced into the earth formations must be substantially more concentrated than is the chlorine in the brine native to the formations displaced thereby. Accordingly, the thermal-neutron absorbing characteristics of fluids native to the earth formations to be logged determine the minimum concentration of the thermal-neutron absorbing substance to be introduced into the earth formations, as the latter must produce an overall increase in the thermal-neutron absorbing characteristics of the earth formation upon displacing native fluids. The use of a boron-containing material is preferred as the thermal-neutron absorbing substance for the reason that the same has an absorption cross section for thermal neutrons that is approximately twenty times greater than that of chlorine. Though generally speaking boron and chlorine are preferred in the practice of the invention for reasons of economy as well as their high thermal-neutron absorption cross sections, various other substances also possess high thermal-neutron absorption characteristics and can be employed in an analogous manner, as will be evident to those skilled in the art. Representative of such substances are compounds of cadmium, dysprosium and gadolinium, although present availability and price of the latter two substances militate against their use at present. It will be understood that when the thermal-neutron absorber is introduced into the earth formations by being incorporated in a drilling fluid, the absorber need not actually be present in the drilling fluid during the time that the portion of the earth formations to be logged is being drilled, but can be incorporated in the drilling fluid at a subsequent time while drilling at a greater depth.

After the thermal-neutron absorber has been artificially introduced into the earth formations 12 according to any of the procedures mentioned above, or according to any of the procedures described in the Russell Patent No. 2,480,674, the earth formations 12 are logged with the apparatus shown in the accompanying drawing. Preferably such logging is preceded by flushing or otherwise removing from within the borehole the thermal-neutron absorbing substance, though such removal from the borehole 10 is not strictly essential, particularly where both the borehole dimensions and the thermal-neutron absorbing characteristics of the fluid filling the same are substantially constant. Ordinarily, though not necessarily, the removal is accomplished by replacement of absorber containing fluid in the borehole by a fluid relatively free of thermal-neutron absorber. Optionally, and preferably in addition to the replacement of borehole fluid by borehole fluid relatively free of the thermal absorbing substance, the logging is conducted with borehole fluids in the immediate vicinity of the housing 14 being displaced by a material relatively transparent to and having a relatively low cross section for thermal neutrons in accordance with the principles disclosed in Patent No. 2,652,496, issued September 15, 1953, to Herzog et al., or Patent No. 2,747,100, issued May 22, 1946, to Wyllie et al.; however, mercury is preferably not used for displacing borehole fluid when the detector 30 is a gamma-ray detector for the reason that mercury produces a substantial amount of gamma rays upon being subjected to a thermal-neutron flux, and it is also a good thermal neutron absorber and would prevent thermal neutrons from reaching the detector 32.

During logging with the apparatus shown in the drawing, it will be evident from the foregoing that the records indicated at 82 and 84 are dependent upon the rates at which the detectors 30 and 32 detect epithermal and thermal neutrons, respectively, assuming that the detector 30 is an epithermal-neutron detector. The operation of the apparatus when the detector 30 is a gamma-ray detector will be described separately.

Upon irradiating the earth formations 12 by fast neutrons from the source 22, a number of processes can occur within the formations 12 affecting the intensity of epithermal-neutron flux as detected by the epithermal-neutron detector 30. Ordinarily, the most important characteristic of the earth formations 12 affecting the intensity of epithermal-neutron flux is the concentration of nuclei of hydrogen in the formations 12. Generally speaking, the effect of the concentration of nuclei of hydrogen upon the intensity of epithermal-neutron flux is such that high concentrations of the nuclei of hydrogen in the formations 12 is accompanied by a diminution in the intensity of the epithermal-neutron flux as detected by the detector 30. Accordingly, the record indicated at 82 is of substantial interpretive value with respect to the concentration of hydrogen nuclei within the earth formations 12, though it will be recognized by those skilled in the art that the record 82 is usually affected (sometimes to a substantial extent) by characteristics of the earth formations 12 other than the concenration of hydrogen nuclei therein. Since in many earth formations, the hydrogen content thereof is largely, if not exclusively, contained in fluids that fill the voids within the earth formations 12, the record 82 can be of considerable interpretive value with respect to the fraction of the overall volume of the earth formations 12 constituted of voids (porosity), as is well known in the art. Inasmuch as the thermal-neutron absorber introduced into the earth formations will ordinarily be employed with a hydrogenous solvent thereof, such as water or oil, the interpretive value of the record 82 is substantially unaffected by the introduction of the neutron absorber.

Upon irradiating the earth formations 12 with fast neutrons from the source 22, the intensity of the thermal-neutron flux in the earth formations 12 as detected by the detector 32 is dependent upon all of the characteristics of the earth formations 12 that influence the intensity of the epithermal-neutron flux and, in addition, is dependent upon processes that can occur within the earth formations 12 that involve thermal neutrons to a relatively greater extent than they involve epithermal neutrons. Pre-eminent among the processes involving thermal neutrons to a relatively greater extent than epithermal neutrons are neutron-capture processes. Thus, the record 84 produced by the recorder 76 is of interpretive value with respect to the thermal-neutron absorbing characteristic of the earth formations 12, especially as to the extent that such characteristic has been modified by the introduction of the thermal-neutron absorber.

The value of the record 84 for such interpretive purposes is lessened considerably for the reason that the same reflects the influence of processes involving fast and epithermal neutrons, as well as thermal neutrons. Accordingly, though the record 84 can be of value in itself, its interpretive value with respect to the thermal-neutron absorbing characteristics of the earth formations 12 is realized to a much greater extent upon correlation of the same with the record 82, since the record 84 reflects processes involving neutrons of fast, thermal and epithermal energies, while the record 82 reflects substantially solely processes involving fast and epithermal neutrons.

Needless to say, given only the records 82 and 84, correlation of the same to interpret the thermal-neutron absorbing characteristics of the earth formations 12 as modified by the artificial introduction of a thermal-neutron absorber thereinto can be very laborious, especially where the records represent a substantial vertical extent of the earth formations 12.

It has been found that there are a number of ways by which the measurements represented by the records 82 and 84 can be correlated in order to afford valuable information concerning the thermal-neutron absorbing properties of the earth formations 12, particularly as modified by the introduction of a strong thermal-neutron absorber thereinto. One procedure is to subtract the measured rate of thermal-neutron detection from the measured rate of epithermal-neutron detection, or more accurately the electrical signals representing such rates after the signals have been normalized to equal values in a region of low neutron absorption. It will be understood that the circuits 56 and 58 include conventional provisions for carrying out such normalization electrically. The values obtained upon such a subtraction tend to increase upon an increase in the overall thermal-neutron absorbing characteristics of the earth formations 12. Where it is desired that a running record be obtained of the difference between the rates at which epithermal and thermal neutrons are detected, this can be conveniently accomplished by making the device 68 a conventional subtractive circuit, as will be understood. Where the device 68 is a subtractive circuit, the logging record indicated at 80 will be the difference between the values recorded at 82 and 84.

Another valuable indication of the overall thermal-neutron absorbing characteristic of the earth formations 12 can be obtained by correlating the measurements represented by the records 82 and 84 in a manner that corresponds to dividing the rate at which epithermal neutrons are detected by the rate at which thermal neutrons are detected. The interpretive value of such a quotient resides in the fact that the quotient will tend to increase whenever the overall thermal-neutron absorbing characteristic of the earth formations 12 increases in a manner relatively independent of processes occurring within the earth formations 12 that involve substantially solely only fast and epithermal neutrons. A logging record of the quotient obtained by dividing the rate at which epithermal neutrons are detected by the rate at which thermal neutrons are detected can be obtained by making the device 68 a conventional ratio responsive circuit in which event the magnitude of the output electrical signal fed by the device 68 to the recorder 64 corresponds to the quotient obtained by dividing the magnitude of the output signal of the integrating circuit 56 by the magnitude of the output signal 58. With such a selection of the device 68, the record 80 will tend to show increasing values for increasing thermal-neutron absorption characteristics of the earth formations 12, and vice versa. Thus, with either alternative type of device 68, the output signal tends to have higher values when the logging probe is juxtaposed with portions of the earth formations having larger amounts of the thermal-neutron absorbing substance artificially introduced thereinto.

In obtaining logs of the character specified, the housing 14 is preferably raised (rather than lowered) at an appropriate logging speed through the borehole 10 so that the vertical position of the housing 14 can be more accurately logged. The borehole 10 can be either cased or left uncased after the introduction of the neutron absorber, inasmuch as the steel of which casings are usually fabricated is substantially transparent to neutrons and gamma rays.

During vertical movement of the housing 14 through the borehole 10, the earth formations 12 are irradiated with fast neutrons from the source 22, and the detectors 30 and 32, respectively, detect thermal and epithermal neutrons that enter the borehole 10 from the formations 12 with the rates at which such neutrons are detected being to a large extent dependent upon the character of the formations 12 in the immediate vicinity of the source 22 and the detectors 30 and 32. As previously mentioned, the rate at which epithermal neutrons are detected by the detector 30 tends to vary inversely with the concentration of hydrogen nuclei in the formations 12. Also, the rate at which epithermal neutrons are detected by the detector 30 can be assumed in many instances to vary in an inverse sense with respect to the porosity of the formations 12. As pointed out previously, the rate at which the detector 32 detects thermal neutrons is dependent upon all the characteristics of the earth formations 12 that affect the intensity and distribution of thermal neutrons in the formations 12, as well as the characteristics of the earth formations 12 that affect the intensity and distribution of epithermal neutrons. Accordingly, the records 82 and 84 obtained during vertical movement of the housing 14 respectively reflect the characteristics of the earth formations 12 that affect the intensity and distribution of epithermal neutrons and such characteristics coupled with further characteristics of the earth formations 12 as modified by the prior introduction of the neutron absorber that affect the intensity and distribution of thermal neutrons. Therefore, the record 82 is of interpretive value primarily with respect to the concentration of hydrogen nuclei in the formations 12 or the porosity of the formations 12. Similarly, the record 84 is of interpretive value with respect to the concentration of hydrogen nuclei in the formations 12 taken together with the thermal-neutron absorbing characteristics of the formations 12 as modified by the prior introduction of a thermal-neutron absorber.

As described previously, the record 80 is more easily and accurately correlatable with the neutron absorbing characteristics of the earth formations 12 than the record 84 irrespective of whether the device 68 performs a subtracting or dividing function, though the latter is preferred.

As has been mentioned, the detector 30 does not necessarily have to be an epithermal-neutron detector, though it is expected that such will most frequently be the case and is preferred for more general applicability; however, in the special situation where the neutron absorbing substance artificially introduced into the earth formations 12 is chlorine incorporated in a liquid hydrogenous medium, the detector 30 can be a gamma-ray detector such as a conventional scintillation crystal and photomultiplier tube combination. The feasibility of employing a gamma-ray detector as the detector 30 where the neutron absorbing substance is chlorine incorporated in a liquid hydrogenous medium arises from the observed fact that the integral gamma-ray response is practically independent of the concentration of chlorine in the displacing liquid hydrogenous medium. Under the described conditions the integral gamma-ray response can be considered for the purposes of the present invention to be a workable equivalent of the epithermal-neutron response. Making the detector 30 either an epithermal-neutron detector or a gamma-ray detector will be within the scope of those skilled in the art.

From the foregoing, the invention and the apparatus for and the method of practicing the same will be clearly understood. It will be understood that conventional means, not shown, for energizing the various electrical circuit elements of the disclosed apparatus for practice of the invention are provided, the same not being shown for the reason that such illustration would only serve to obscure novel features, as will be appreciated by those skilled in the art. It will be clear to those familiar with radiological methods of borehole logging that the illustrated apparatus and described mode of practice of the invention are susceptible to numerous variations without departing from the principles of the invention, and accordingly reference should be made to the appended claims in order to ascertain the actual scope of the invention.

I claim:

1. In the art of logging earth formations through which a borehole passes, the improvement comprising applying to the face of the borehole a chlorine containing fluid under a pressure in excess of the fluid pressure prevailing within the formation; thereafter subjecting the formation to a flux of fast neutrons from a source thereof in the borehole, concurrently producing a first electrical signal having a magnitude that is a function of the rate at which gamma rays enter the borehole adjacent the fast neutron source, concurrently producing a second electrical signal having a magnitude that is a function of the rate at which thermal neutrons enter the borehole adjacent the fast neutron source, and electrically correlating the magnitudes of the signals to establish a useful relationship with respect to the penetration of said fluid into the formation.

2. In the art of logging earth formations through which a borehole passes, the improvement comprising applying to the face of the borehole fluid under a pressure in excess of the fluid pressure prevailing within the formation, said fluid comprising a class of atomic nuclei adapted to modify the nuclear response of the formation to irradiation by fast neutrons, with said nuclear response being modified to relatively different degrees with respect to thermal and epithermal neutrons; thereafter subjecting the formation to a flux of fast neutrons from a source thereof moved in the borehole, concurrently producing a first electrical signal having a magnitude that is a function of the rate at which thermal neutrons enter the borehole adjacent the fast neutron source, concurrently producing a second electrical signal having a magnitude that is a function of the rate at which epithermal neutrons enter the borehole adjacent the fast neutron source, effecting an output electrical signal that is a function of the magnitudes of the signals, and recording said output signal versus the depth of the source in the borehole.

3. The method of claim 2, wherein said class of atomic nuclei is the nuclei of a naturally occurring element selected from the group consisting of boron, chlorine, cadmium, dysprosium, and gadolinium, and mixtures thereof.

4. The method of claim 3, wherein said class of atomic nuclei is the nuclei of the naturally occurring element boron.

5. The method of claim 3, wherein said class of atomic nuclei is the nuclei of the naturally occurring element chlorine.

6. The method of claim 3, wherein said class of atomic nuclei is the nuclei of the naturally occurring element cadmium.

7. The method of claim 3, wherein said class of atomic nuclei is the nuclei of the naturally occurring element dysprosium.

8. The method of claim 3, wherein said class of atomic nuclei is the nuclei of the naturally occurring element gadolinium.

References Cited in the file of this patent

UNITED STATES PATENTS

| | | |
|---|---|---|
| 2,667,583 | Herzog | Jan. 26, 1954 |
| 2,680,201 | Scherbatskoy | June 1, 1954 |
| 2,726,338 | Goodman | Dec. 6, 1955 |
| 2,741,705 | McKay | Apr. 10, 1956 |
| 2,785,314 | Grahame | Mar. 12, 1957 |
| 2,842,675 | Scherbatskoy | July 8, 1958 |